US008449974B2

(12) United States Patent
Lussey et al.

(10) Patent No.: US 8,449,974 B2
(45) Date of Patent: May 28, 2013

(54) ELECTRICALLY RESPONSIVE COMPOSITE MATERIAL, A METHOD OF MANUFACTURE AND A TRANSDUCER PRODUCED USING SAID MATERIAL

(75) Inventors: David Lussey, Tunstall (GB); David Bloor, Durham (GB); Paul Jonathan Laughlin, Houghton-le-Spring (GB); Adam Graham, Durham (GB); Cyril Hilsum, Pinner (GB)

(73) Assignee: Peratech Limited, Brompton on Swale, Richmond (GB)

(*) Notice: Subject to any disclaimer, the term of this patent is extended or adjusted under 35 U.S.C. 154(b) by 733 days.

(21) Appl. No.: 12/547,855

(22) Filed: Aug. 26, 2009

(65) Prior Publication Data

US 2010/0062148 A1 Mar. 11, 2010

(30) Foreign Application Priority Data

| | | |
|---|---|---|
| Aug. 29, 2008 | (GB) | 0815724.0 |
| Jan. 23, 2009 | (GB) | 0901103.2 |
| May 26, 2009 | (GB) | 0909001.0 |

(51) Int. Cl.

| | |
|---|---|
| ***B32B 5/16*** | (2006.01) |
| ***B05D 5/12*** | (2006.01) |
| ***H01B 1/12*** | (2006.01) |

(52) U.S. Cl.
USPC ............ 428/323; 428/328; 427/77; 427/96.1; 252/519.33; 252/500

(58) Field of Classification Search
None
See application file for complete search history.

(56) References Cited

U.S. PATENT DOCUMENTS

| | | | |
|---|---|---|---|
| 2004/0162365 | A1 | 8/2004 | Matsumoto et al. |
| 2008/0023675 | A1 | 1/2008 | Kosowsky |

FOREIGN PATENT DOCUMENTS

| | | | |
|---|---|---|---|
| EP | 1207572 | A | 5/2002 |
| JP | 08120182 | A | 5/1996 |
| JP | 2004185855 | A | 7/2004 |
| JP | 2007149631 | A | 6/2007 |
| WO | 9833193 | A1 | 7/1998 |

*Primary Examiner* — Sheeba Ahmed

(57) ABSTRACT

An electrically responsive composite material is disclosed, along with a method of producing an electrically responsive composite material, a transducer having a substrate for supporting a flowable polymer liquid and a method of fabricating a transducer. The electrically responsive composite material produced is configurable for application in a transducer. The method includes the steps of receiving the flowable polymer liquid and introducing electrically conductive acicular particles (1501, 1502) to facilitate the conduction of electricity by quantum tunneling. Dielectric particles (1505, 1506) are added of a size relative to the acicular particles such that a plurality of these dielectric particles are dispersed between adjacent acicular particles.

21 Claims, 22 Drawing Sheets

| Resin | Solvent | Dielectric Powder (Titanium dioxide - TiO2) | Electroactive Particle Shape | Electroactive Powder (Ishihara Type FT-2000) |
|---|---|---|---|---|
| 1 | 3.8 | 3.11 | Acicular | 1.41 |

*Figure 3A*

| Resin | Solvent | Dielectric Powder (Titanium dioxide - TiO2) | Electroactive Particle Shape | Electroactive Powder (Ishihara Type ET-500W) |
|---|---|---|---|---|
| 1 | 3.8 | 3.11 | Spherical | 3.05 |

*Figure 3B*

Figure 8: Normalised resistance vs force for composition (acicular electroactive filler) and reference composition (spherical electroactive filler) of the first sample Figure 9: Normalised resistance vs force for composition (acicular electroactive filler) and reference composition (spherical electroactive filler) of the first example at 0-5N Figure 10: Force applied to second composition sample and second reference composition sample of the second example, defining a single run Figure 13: Normalised resistance at 50N for composition (acicular electroactive filler) and reference composition (spherical electroactive filler) of the second example

ELECTRICALLY RESPONSIVE COMPOSITE MATERIAL, A METHOD OF MANUFACTURE AND A TRANSDUCER PRODUCED USING SAID MATERIAL

CROSS REFERENCE TO RELATED APPLICATIONS

This application claims priority from United Kingdom Patent Application number 0815724.0, filed 29 Aug. 2008, from United. Kingdom Patent Application number 0901103.2, filed 23 Jan. 2009, and from United Kingdom patent application number 0909001.0 filed 26 May 2009, the whole contents of which are incorporated herein by reference in their entirety.

BACKGROUND OF THE INVENTION

1. Field of the Invention

The present invention relates to a method of producing an electrically responsive composite material configurable for application in a transducer. The present invention also relates to an electrically responsive composite material configurable for application in a transducer. The present application also relates to a method of fabricating a transducer and to a transducer having a substrate for supporting a flowable polymer liquid.

2. Description of the Related Art

An electrically responsive composite material configurable for application in a transducer is described in U.S. Pat. No. 6,291,568. The composite material includes electrically conductive particles dispersed within and encapsulated by a non-conductive polymer. The nature and concentration of the particles is such that the electrical resistivity of the material is variable in response to distortion forces being applied thereto. However, the polymer material is not in a liquid form which in turn restricts the total number of applications for which the material may be deployed. Furthermore, the disclosed material relies on the presence of void-bearing particles with protrusions such that electric fields are concentrated and conduction is permitted by field-assisted quantum tunnelling. However, it has been found, that materials of this type introduce undesirable levels of electrical noise when deployed in transducer applications.

An electrically responsive composite material configurable for application in a transducer is described in WO 2008/135,787, the whole contents of which are included herein by way of reference. The disclosed material has a substantially non-conductive polymer with first electrically conductive particles that have void-bearing structures in combination with second electrically conductive particles that are acicular in shape. The polymer material described in WO 2008/135,787 allows transducers to be developed that exhibit far superior noise characteristics due to the presence of the acicular particles. However, the presence of the void-bearing particles creates difficulties in terms of developing a flowable polymer liquid for application in a device, whereafter a transition is facilitated to convert the flowable polymer liquid into a resilient solid polymer.

An alternative proposal is identified in WO 2008/135,787 in which a non-conducting polymer is mixed with acicular conductive particles, with no void-bearing particles being present. The proposal of WO 2008/135,787 also identifies the possibility of manufacturing the composite material using a non-conductive solvent or water based polymer such that the material is usable as a flowable polymer liquid thereby facilitating its application in transducer devices. However, further problems have been identified with composite materials of this type when used in transducer applications.

Known devices do allow a resilient material to be formed (possibly by evaporation of a solvent) that exhibit a property to the effect that electrical resistance may vary when a force is applied. However, materials of this type show an inadequate response prior to the material becoming sensitive to the application of pressure. Thus, the inventors have found that the provision of spiky void-bearing particles present in the material described in U.S. Pat. No. 6,291,568 provides a first touch sensitivity. However, the presence of these particles has the disadvantage of introducing electrical noise and they are difficult to deploy in situations where a flowable polymer liquid is required for construction purposes.

BRIEF SUMMARY OF THE INVENTION

According to a first aspect of the present invention, there is provided a method of producing an electrically responsive composite material configurable for application in a transducer, comprising the steps of receiving a flowable polymer liquid; introducing electrically conductive acicular particles to facilitate the conduction of electricity by quantum tunnelling; and adding dielectric particles of a size relative to said acicular particles such that a plurality of said dielectric particles are dispersible between adjacent acicular particles.

In a preferred embodiment, the electrically responsive composite material is configurable in a transducer by applying said material in its flowable liquid form and facilitating a transition to a resilient solid form.

According to a second aspect of the present invention, there is provided an electrically responsive composite material configurable for application in a transducer, comprising a flowable polymer liquid; electrically conductive acicular particles that facilitate the conduction of electricity through a solid polymer by quantum tunnelling; and dielectric particles of a size such that a plurality of said dielectric particles are dispersed between many adjacent acicular particles.

In a preferred embodiment, the dielectric material is titanium dioxide. Preferably, the acicular particles have a large dimension and a small dimension and the size of said dielectric particles is of a similar order to said small dimension. The small dimension may have a size of between 10 nano-meter and 300 nano-meter.

According to a third aspect of the present invention, there is provided a method of fabricating a transducer, comprising the steps of applying a flowable polymer liquid that contains electrically conductive acicular particles and dielectric particles; facilitating a transition of said flowable polymer liquid to a resilient solid polymer, in which said resilient solid polymer has conductive acicular particles dispersed therein in combination with said dielectric particles; wherein said dielectric particles are of a size relative to said acicular particles such that a plurality of said dielectric particles are dispersed between adjacent acicular particles.

In a preferred embodiment, the flowable polymer liquid is applied to a circuit board. In an alternative preferred embodiment, the flowable polymer is applied to an electrode, a textile or a film.

According to a fourth aspect of the present invention, there is provided a transducer having a substrate for supporting a flowable polymer liquid, facilitating a transition of said flowable polymer liquid to form a resilient solid polymer material and facilitating the connection of said resilient solid polymer material to an electric circuit, wherein: said resilient polymer material has conductive acicular particles dispersed therein in combination with dielectric particles; and said dielectric particles are of a size relative to said acicular particles such that a plurality of said dielectric particles are dispersed between adjacent acicular particles.

BRIEF DESCRIPTION OF THE SEVERAL VIEWS OF THE DRAWINGS

FIG. 3*a* is a table that shows relative amounts (by weight) of resin, solvent, dielectric powder and acicular electrically active powder for first and second examples of compositions according to the invention.

FIG. 3*b* is a table that shows relative amounts (by weight) of resin, solvent, dielectric powder and spherical electrically active powder for first and second examples of reference compositions according to prior art.

DETAILED DESCRIPTION OF THE PREFERRED EMBODIMENTS

FIG. 1

Figure 1:
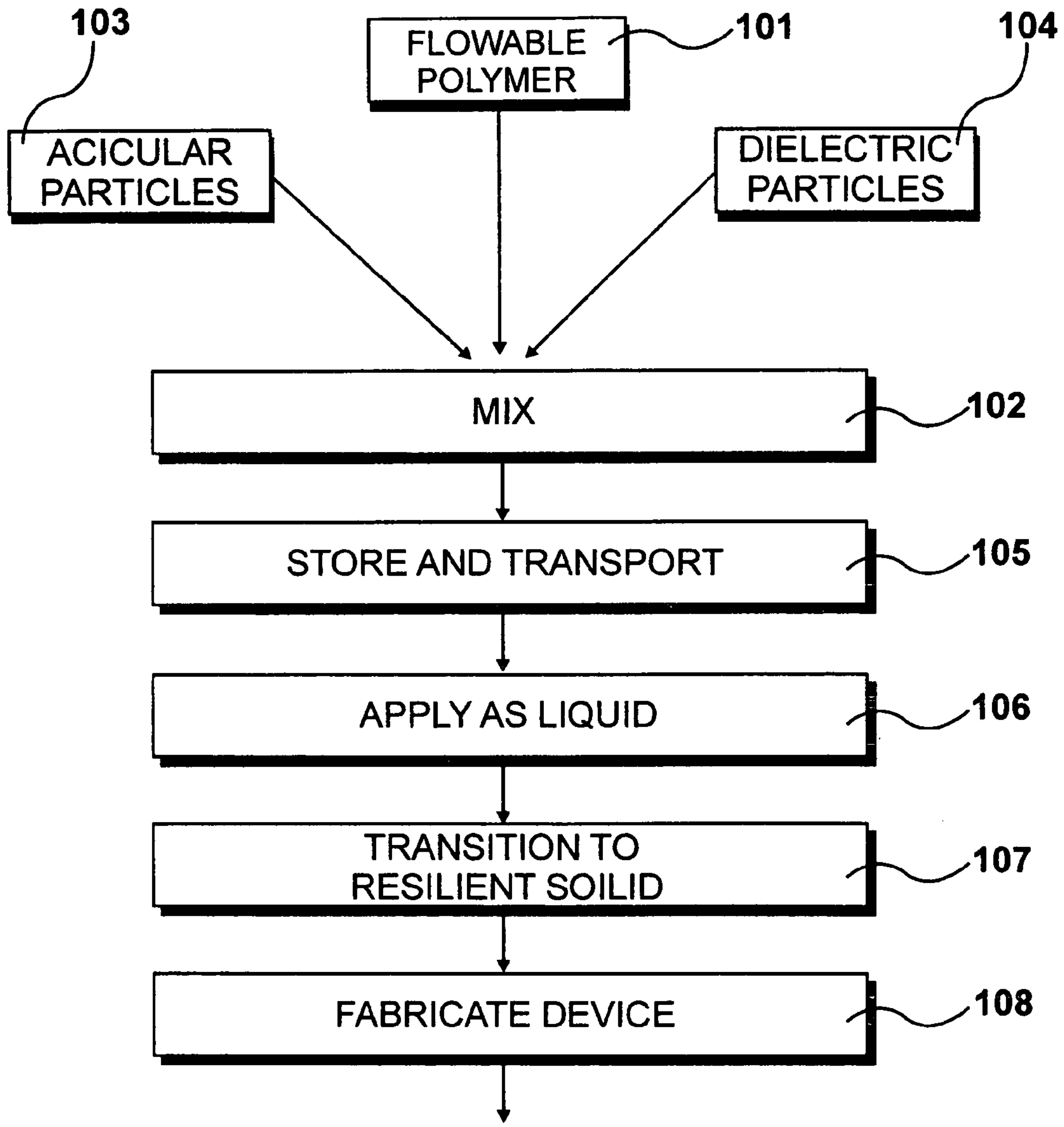
FIG. 1 illustrates a method of production and use of a material embodying the present invention.

A method of producing an electrically responsive composite material configurable for application in a transducer is illustrated in FIG. 1. A flowable polymer liquid 101 is received within a mixing process 102. Electrically conductive acicular particles 103 are introduced to said mixing process 102 which facilitate the conduction of electricity by quantum tunnelling. Furthermore, dielectric particles 104 are added of a size relative to the acicular particles such that a plurality of the dielectric particles are dispersed between many adjacent acicular particles.

Operation of the device depends predominantly on quantum tunnelling therefore any transducer device relying on the material relies heavily on electric field emission. As is known, the inclusion of dielectric particles impact upon the dielectric characteristics of the resulting composite and would therefore tend to have a detrimental effect upon the required electric field emission. Thus, it would normally appear counter intuitive to include dielectric particles within a composite which relies so heavily on electric field emission in order to achieve the desired operational performance.

After mixing at step 102 the material may be stored and transported as shown at step 105. The flowable polymer liquid may take on a consistency substantially similar to an ink and the dielectric particles may be obtained in the form of an ink, commercially available as such. The acicular particles are small enough for them to be included in a pigment and the dielectric particles are smaller. In a preferred embodiment, the large dimension of the acicular particles is in the micron range, with the small dimension of the acicular particles being in the nano range with the dielectric particles having a substantially similar scale.

The relative sizes of the particles are such that a plurality of dielectric particles lie between many (not necessarily all) adjacent acicular particles. Preferably, the dielectric particles are coated with an organic material thereby making them dispersible and stopping them sticking together in a lump. This facilitates the dispersion of the particles such that a plurality may lie between many adjacent pairs of acicular particles.

There is a barrier between particles that it is necessary to tunnel through in order to achieve conduction. Unless the particles are in direct contact, very little current will flow. However, the presence of acicular particles with their pointed ends (as described in WO 2008/135,787) creates fields that narrow the energy barrier such that tunnelling becomes possible. The field at the points of the acicular particles is reduced by the dielectric material because the dielectric constant has gone up. However, the dielectric particles introduce additional energy levels that can assist the tunnelling process and effectively reduce the tunnelling distance. The charges go through a slightly more complex path. Thus, in the right circumstances it is possible to obtain high current, where a lower current would have been predicted. This in turn changes the initial characteristic to give the desirable first touch behaviour. The inclusion of the dielectric particles also tends to provide a larger active range which in combination with the immediate finger touch effect allows transducers to be developed with highly desirable characteristics.

Further investigation has revealed that without the presence of the dielectric particles, it is possible for a build-up of charge to occur in the polymer regions. This makes the composite material more conductive but with continued application of force, the material increases its conductivity so that there is a drift in terms of its overall response. Further experiment has shown that in the presence of the dielectric particles, this drift tends not to happen.

It is also known that acicular particles tend to be less stable over the longer term due to their mechanical properties. They are less stable under high forces because more opportunities exist for deformation to occur; a needle can be bent or snapped for example. The dielectric particles improve this position such that the mechanical integrity of the material is enhanced.

To summarise, although counter intuitive for reasons of decreasing the available electric field, the inclusion of the dielectric particles improves the first touch response of the transducer mechanism, increases the repeatability of the transducer mechanism by reducing drift and also improves the overall mechanical integrity of the material.

As illustrated in FIG. 1, when deployed, the material may be applied as a liquid, as illustrated at 106.

At step 107 a transition occurs from the liquid state to a resilient solid state. This transition may occur due to the evaporation of a solvent; the solvent being water or an organic solvent for example dependent upon the nature of the polymer. Alternatively, for silicon based polymers, it is possible for the material to be cured or set by the addition of a setting agent. In an alternative mode for effecting the transition at step 107, it is possible for some polymer materials to be cured in the presence of radiation, such as ultraviolet radiation.

Thereafter, having created the resilient transducer material, the overall device may be fabricated, as illustrated by step 108.

FIG. 2

Figure 2:
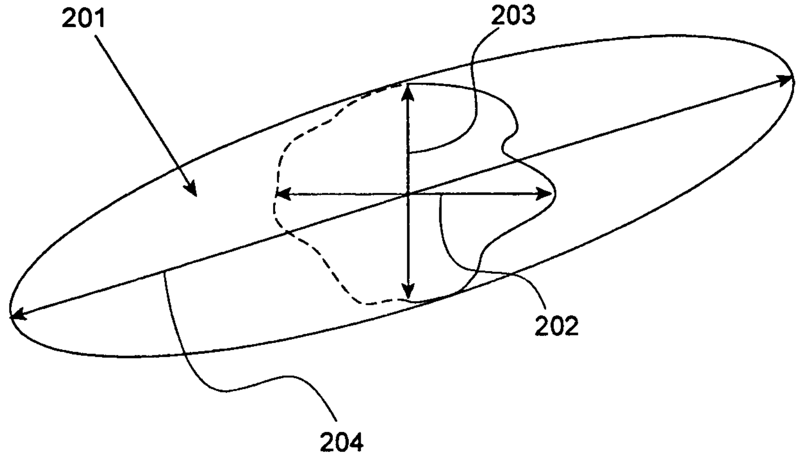
FIG. 2 shows a generalised acicular shape.

A generalised acicular shape is illustrated in FIG. 2. Shape 201 has a width 202, height 203 and a length 204. The ratio of the length to the width of a shape is referred to herein as 'the aspect ratio'. Herein, the term 'acicular' is used to describe a shape that has an aspect ratio that is greater than 1:1. The term 'spherical' is used to describe a shape that has a circular cross-section and an aspect ratio equal to 1:1. Both regularly and irregularly shaped acicular particles may be used in the composition.

FIGS. 3A and 3B

FIG. 3A is a table that shows relative amounts (by weight) of resin, solvent, dielectric powder and electrically active acicular powder for first and second examples of polymer compositions according to this invention. FIG. 3B is a table that shows relative amounts (by weight) of resin, solvent, dielectric powder and electrically active spherical powder for first and second examples of reference polymer compositions according to prior art.

FIGS. 4-9

FIGS. 4-9 relate to a first example of polymer composition.

In Example 1 outlined below, a first composition contains electrically semi-conductive acicular powder as the electrically active filler, whereas a first reference composition contains electrically semi-conductive spherical powder as the electrically active filler.

EXAMPLE 1

First Composition (Acicular Electrically Active Filler)

Polyplast Type PY383 is a solvent-based vinyl resin. 73.5 g of PY383 were measured into a beaker. Added to this were 55.3 g Polyplast ZV545 solvent, 83.4 g Kronos Type 1080 titanium dioxide powder and 37.8 g Ishihara FT-2000 acicular semi-conductive powder. FT-2000 comprises titanium dioxide coated with tin dioxide that has been doped with antimony. The ingredients were stirred manually for five minutes and then decanted into a Dispermat VMA-Getzmann Model D-51580 bead mill charged with 80 cc 0.8-1.0 mm beads. The blend was driven through the bead chamber (rotating at 4000 rpm) using a Dispermat SL press at 0.7 ml/second.

After decantation from the bead mill the composition was doctor bladed onto 50 micron brass shim and dried in an oven at 90C for 30 mins.

First Reference Composition (Spherical Electrically Active Filler)

As a comparison, a blend containing 62.5 g Polyplast Type PY383, 47.0 g Polyplast ZV545 solvent, 70.9 g Kronos Type 1080 titanium dioxide and 69.6 g Ishihara ET-500W spherical semi-conductive powder was bead milled, doctor bladed and cured under the same conditions as described above. ET-500W is the same composition as FT-2000, differing only in shape.

Testing

The loadings of the FT-2000 and ET-500W were chosen to equalize their relative surface areas in the compositions, thus producing inks with similar uncured viscosities.

The resistance-force responses of the samples were measured using an Instron Model 5543 Single Column Testing System, with a 500N load cell. A 1 cm×1 cm square of 50 micron brass shim was placed on the surface of the samples as a top electrode; the bottom electrode was the brass shim that the samples were doctor bladed onto. A 4 mm diameter stainless steel probe compressed the brass shim/ink/brass shim structure at a rate of 5 mm/min from 0N to 200N to 0N, repeated 100 times. The electrical resistance of the samples was measured using a Keithley 2000 digital multimeter.

Figure 4:
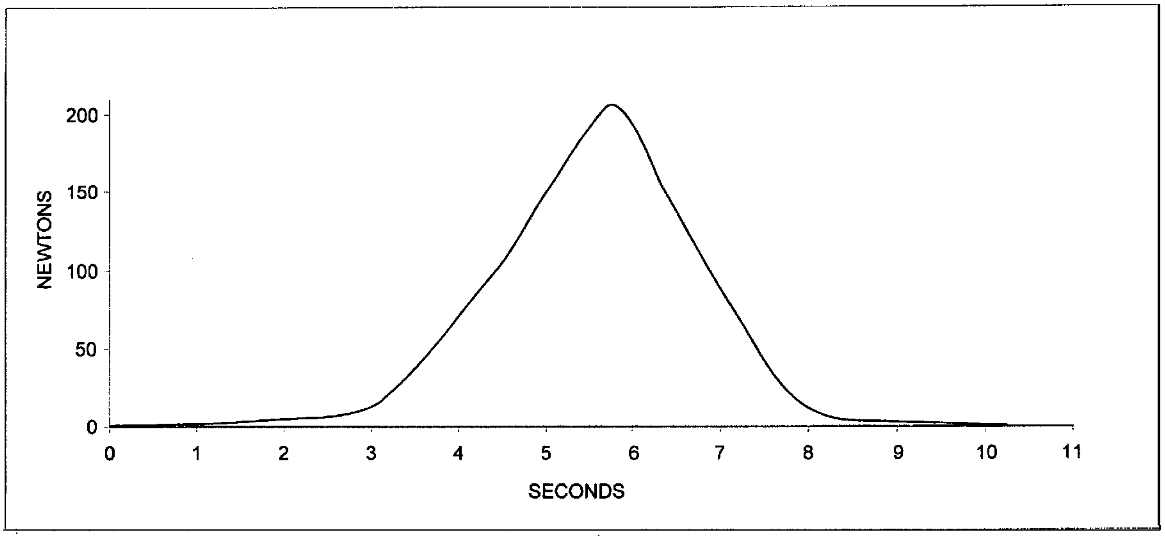
FIG. 4 is a graphic representation showing the force profile applied to a first composition sample according to this invention (FIG. 3*a*—acicular electrically active powder) and a first reference composition (FIG. 3*b*—spherical electrically active powder) described in the first example. The force profile shown defines a single run.

FIG. 4 is a graphic representation showing the force profile applied to a first composition sample (acicular electrically active powder) and a first reference composition (spherical electrically active powder) of Example 1, the force profile defining a single run.

Figure 5:
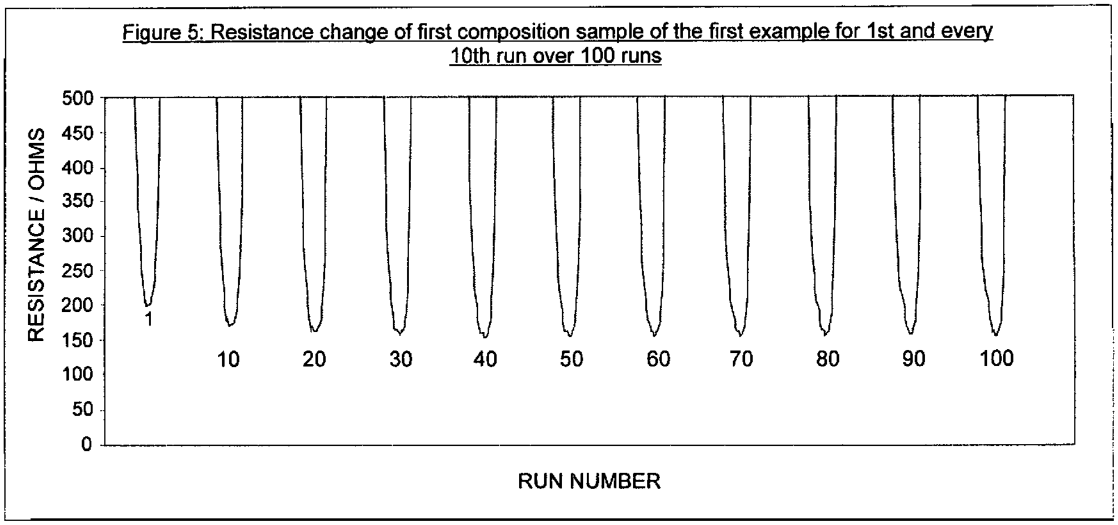
FIG. 5 is a graphic representation showing the resistance profiles of a first composition sample according to this invention (FIG. 3*a*—acicular electrically active powder) described in the first example, subjected to 100 repetitions of the single run described in FIG. 4, for specific run numbers.

FIG. 5 is a graphic representation showing the resistance profiles of the first composition sample (acicular electrically active powder) of Example 1 for the $1^{st}$ and every $10^{th}$ application of 100 single runs described in FIG. 4.

Figure 6:
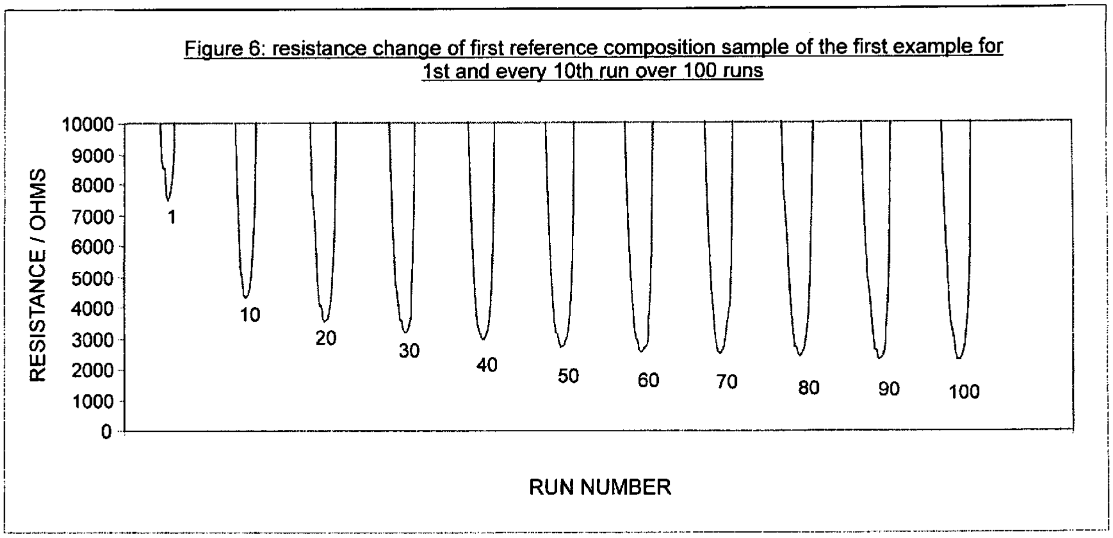
FIG. 6 is a graphic representation showing the Resistance profiles of a first reference composition sample (FIG. 3*b*—spherical electrically active powder) described in the first example, subjected to 100 repetitions of the single run described in FIG. 4, for specific run numbers.

FIG. 6 is a graphic representation showing the Resistance profiles of the first reference composition sample (spherical electrically active powder) of Example 1 for the $1^{st}$ and every $10^{th}$ application of 100 single runs described in FIG. 4.

By comparison of FIGS. 5 and 6, it can be seen that the first reference composition sample (spherical electrically active filler) displays steady and continuous change in response with use, whereas the first composition sample (acicular electrically active filler) displays a more stable response with use.

Figure 7:
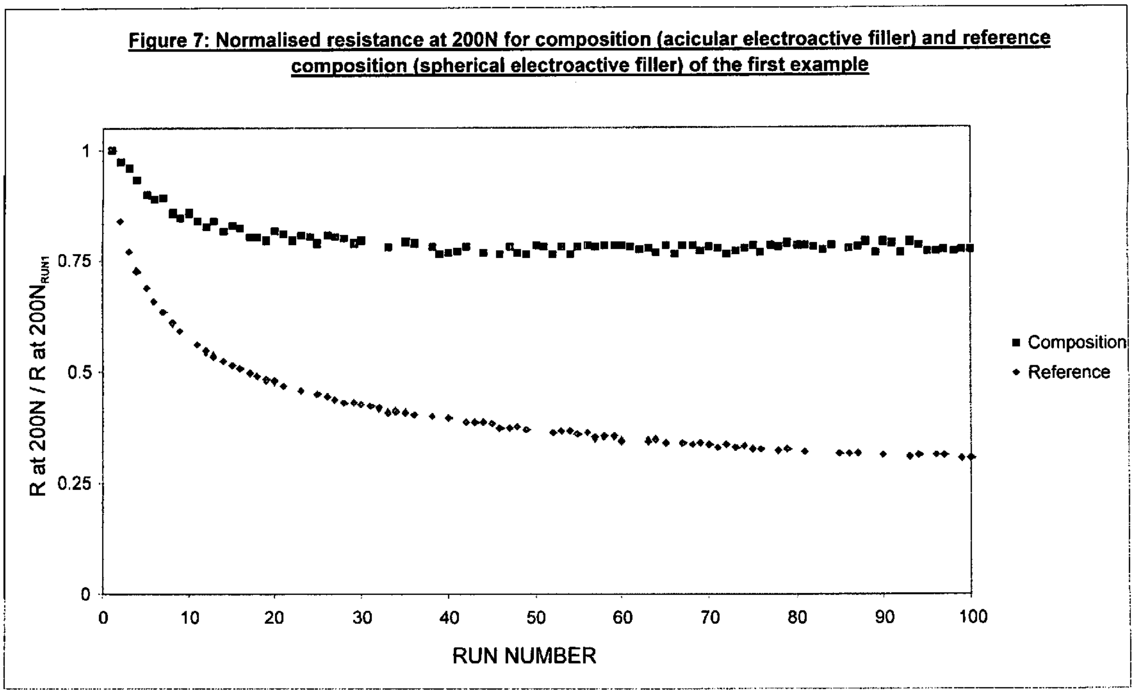
FIG. 7 shows a graphic representation plotting resistance at 200 Newtons (N) (normalised to resistance at 200N for run 1) v run number for the first composition sample according to this invention (FIG. 3*a*—acicular electrically active powder), and the first reference composition sample (FIG. 3*b*—spherical electrically active powder), described in the first example.

FIG. 7 is a graphic representation plotting the resistance (R) at 200N of the first composition sample (acicular electrically active filler) and the first reference composition sample (spherical electrically active filler), normalized to the resistance value at 200N for the first run (R at $200N_{RUN1}$) v run number over 100 runs.

It can be seen from FIG. 7 that the first composition sample (acicular electrically active filler) displays asymptotic behaviour, whereas the first reference composition sample (spherical electrically active filler) displays power law behaviour.

From FIG. 7, it is evident that a combination of acicular electrically active particles and dielectric particles results in improved repeatability compared to a combination of spherical electrically active particles and dielectric particles. Synergy between acicular electroactive particles and dielectric particles exceeds synergy between spherical electroactive particles and dielectric particles. Thus, it is presented that the difference in shape of the electrically active filler in combination with the dielectric particle filler results in a difference in response with repeated use.

Figure 8:
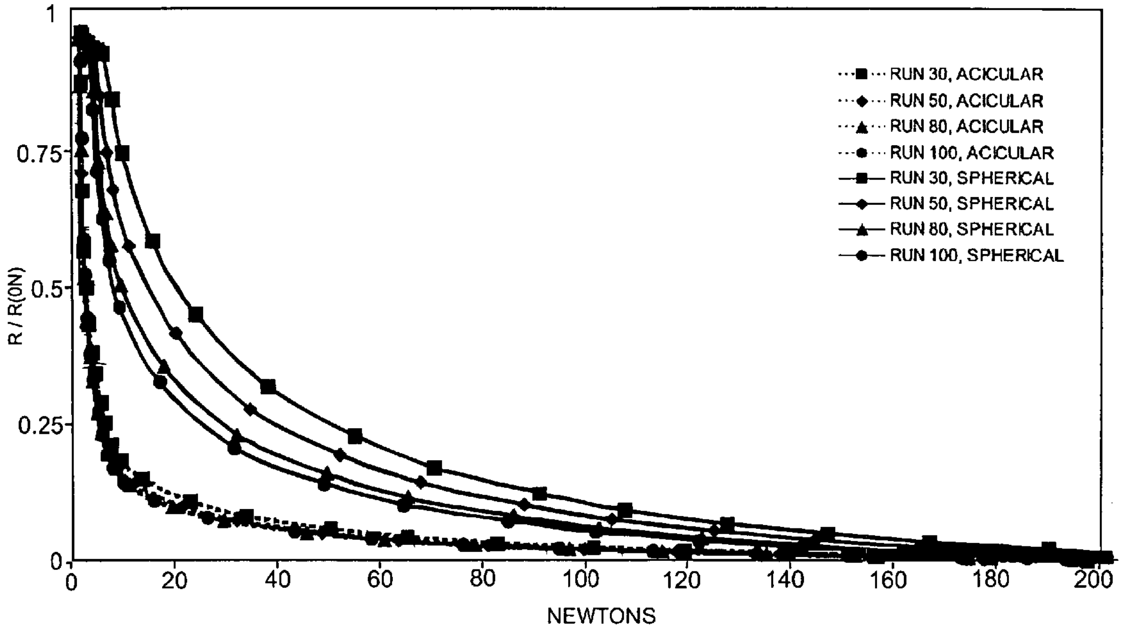
FIG. 8 is a graphic representation plotting resistance v force (normalised to the resistance at first contact) for the first composition sample according to this invention (FIG. 3*a*—acicular electrically active powder) and the first reference composition sample (FIG. 3*b*—spherical electrically active powder), described in the first example, for specific run numbers.

FIG. 8 is a graphic representation showing the resistance-force characteristics (normalised to the resistance at first contact) at four specific run numbers (runs 30, 50, 80 and 100) of the first composition sample (acicular electrically active filler) and the first reference composition sample (spherical electrically active filler).

FIG. 8 illustrates three improvements in using acicular electrically active particles and dielectric particles in the compositions compared to a combination of spherical electrically active particles and dielectric particles.

Firstly, the acicular based samples show very little variation in force response over consecutive cycles. This is highlighted by the overlaying of the acicular based data for each of the selected runs, showing specifically that the acicular based sample has constant response characteristics once it reaches the asymptotic plateau. This is an improvement over prior art, shown by the spherical based data which does not overlay and each run tends to a different value. The second feature to observe is the much smoother onset of the acicular based sample at first contact and low applied force. Thirdly, at low forces, the acicular based sample shows far greater sensitivity compared to the spherical based sample.

Figure 9:
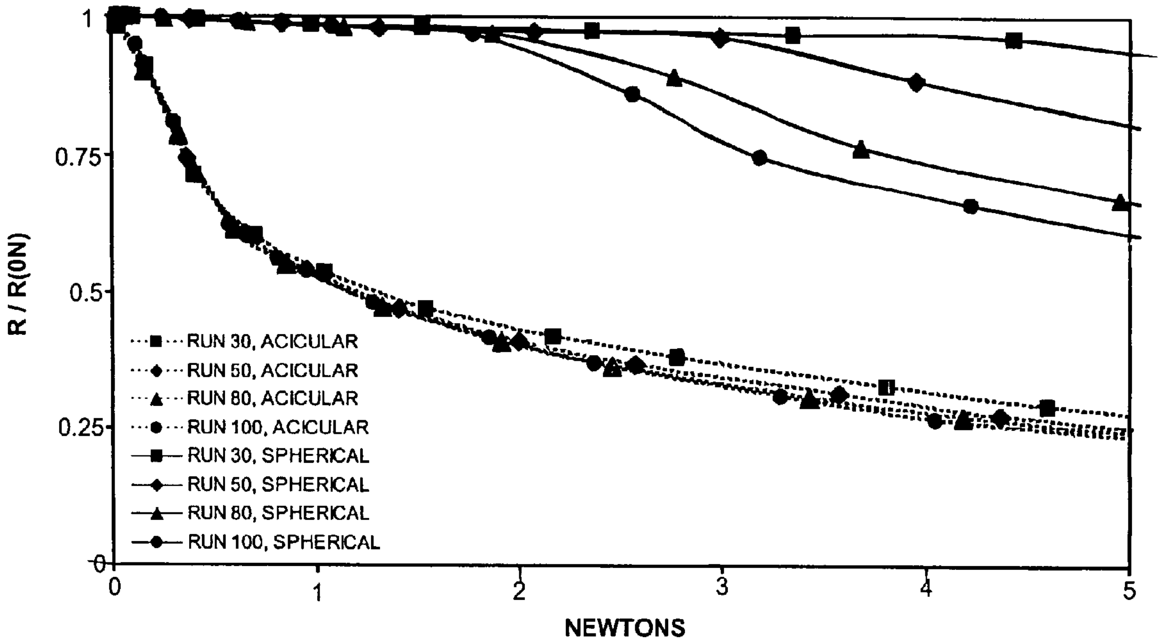
FIG. 9 shows a portion of FIG. 8 in further detail.

FIG. 9 is a portion of FIG. 8, showing the resistance-force characteristics (normalised to the resistance at first contact) at four specific run numbers (runs 30, 50, 80 and 100) of, the first composition sample (acicular electrically active filler) and the first reference composition sample (spherical electrically active filler), for the first 5N of force.

FIG. 9 highlights the second and third features discussed with reference to FIG. 8. The smooth onset of the resistance-force response at low force for the acicular-based sample, and the increased sensitivity compared to that of the spherical-based sample, are both evident.

FIGS. 10-13

FIGS. 10-13 relate to a second example. In Example 2 outlined below, a second composition contains electrically semi-conductive acicular powder as the electrically active filler, whereas a second reference composition contains electrically semi-conductive spherical powder as the electrically active filler.

EXAMPLE 2

Second Composition (Acicular Electrically Active Filler)

The ingredients and ratios of the ingredients for the second composition were the same as for the first composition of Example 1.

However, the composition was blended by mechanically stirring with a magnetic stirrer at 400 rpm for 30 minutes.

In a similar manner to Example 1, the composition was doctor bladed onto 50 micron brass shim and dried in an oven at 90C for 30 mins.

Second Reference Composition (Spherical Electrically Active Filler)

The ingredients and ratios of the ingredients for the second reference composition were the same as for the first reference composition of Example 1.

However, the composition was blended by mechanically stirring with a magnetic stirrer at 400 rpm for 30 minutes.

Again, in a similar manner to Example 1, the composition was doctor bladed onto 50 micron brass shim and dried in an oven at 90C for 30 mins.

Testing

The testing is the same as for Example 1, except that the probe compressions were performed from 0N to 50N to 0N, repeated 200 times.

Figure 10:
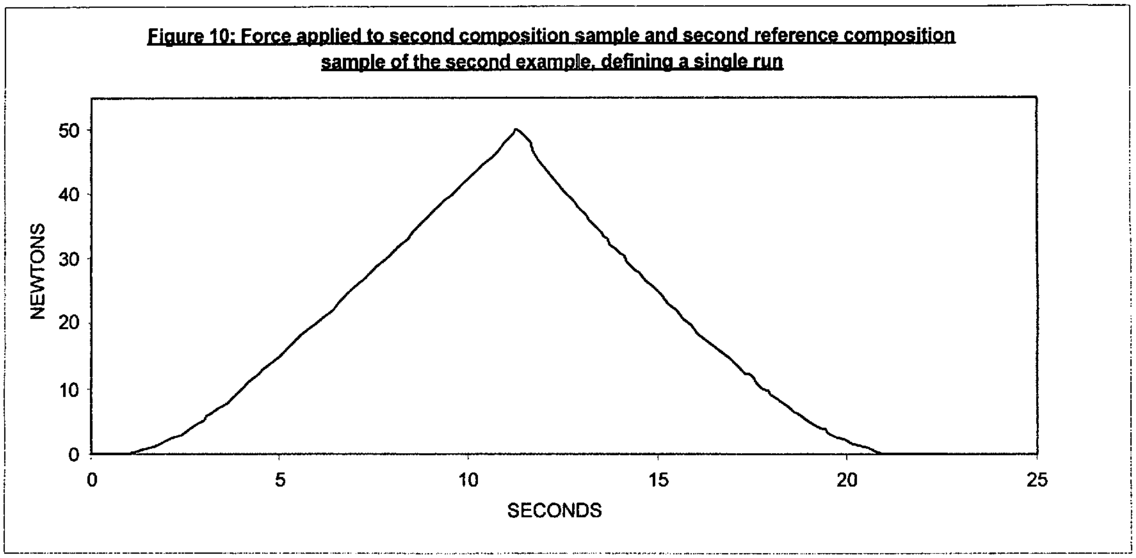
FIG. 10 is a graphic representation showing the force profile applied to a second composition sample according to this invention (FIG. 3*a*—acicular electrically active powder) and a second reference composition (FIG. 3*b*—spherical electrically active powder) described in the second example. The force profile shown defines a single run.

FIG. 10 is a graphic representation showing the force profile applied to a second composition sample (acicular electrically active powder) and a second reference composition sample (spherical electrically active powder) of Example 2, the force profile defining a single run.

Figure 11:
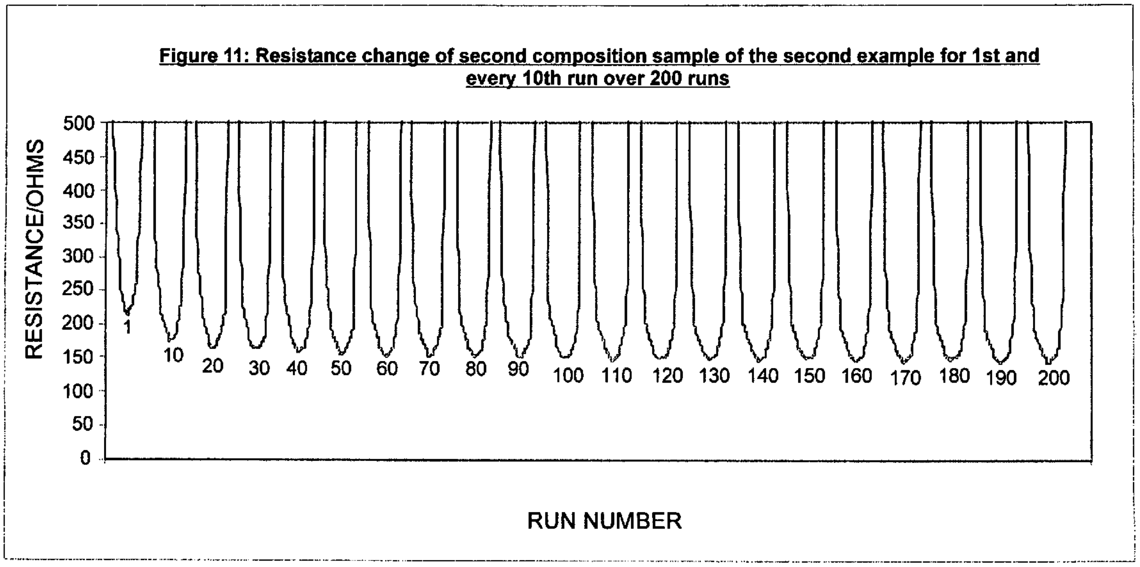
FIG. 11 is a graphic representation showing the resistance profiles of a second composition sample according to this invention (FIG. 3*a*—acicular electrically active powder) described in the second example, subjected to 200 repetitions of the single run described in FIG. 10, for specific run numbers.

FIG. 11 is a graphic representation showing the resistance profiles of the second composition sample (acicular electrically active powder) of Example 2 for the $1^{st}$ and every $10^{th}$ application of 200 single runs described in FIG. 10.

Figure 12:
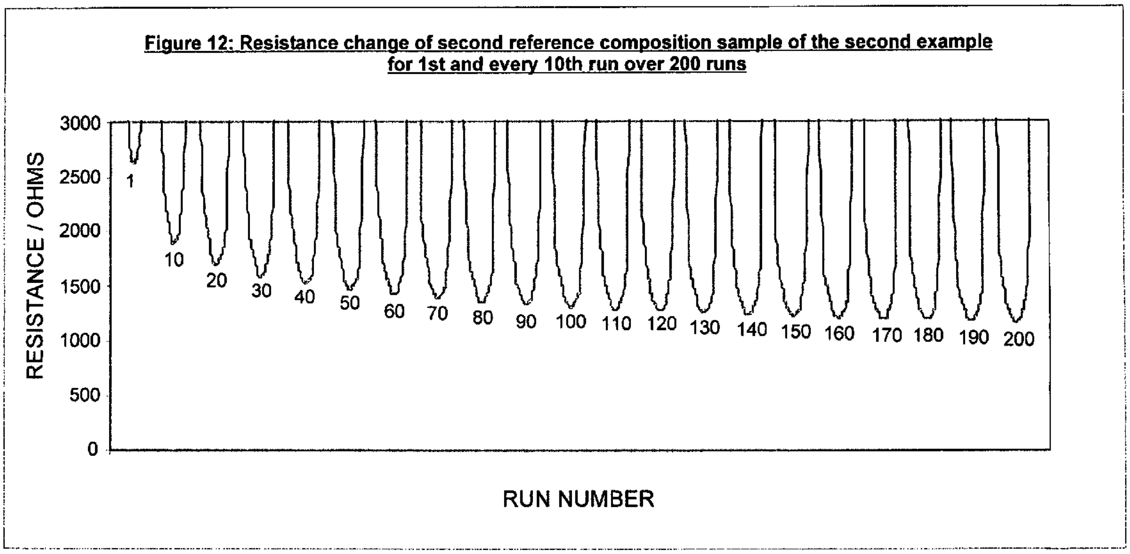
FIG. 12 is a graphic representation showing the resistance profiles of a second reference composition sample (FIG. 3*b*—spherical electrically active powder) described in the second example, subjected to 200 repetitions of the single run described in FIG. 10, for specific run numbers.

FIG. 12 is a graphic representation showing the resistance profiles of the second reference composition sample (spherical electrically active powder) of Example 2 for the $1^{st}$ and every $10^{th}$ application of 200 single runs described in FIG. 10.

Figure 13:
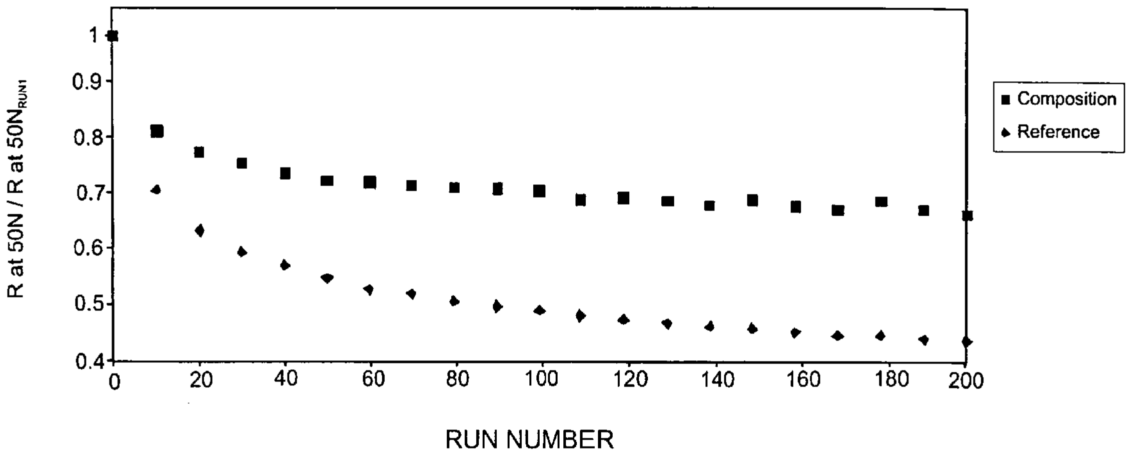
FIG. 13 shows a graphic representation plotting resistance at 50N (normalised to resistance at 50N for run 1) for the 1st and every 10th run number for the second composition sample according to this invention (FIG. 3*a*—acicular electrically active powder) and the second reference composition sample (FIG. 3*b*—spherical electrically active powder), described in the second example.

FIG. 13 is a graphic representation plotting the resistance (R) at 50N of the second composition sample (acicular electrically active filler) and the second reference composition sample (spherical electrically active filler), normalised to the resistance value at 50N for the first run (R at $50N_{RUN1}$) v run number over 200 runs.

From comparison of FIGS. 11, 12 and 13 it is evident that under a different blending regime to Example 1, a combination of acicular electrically active particles and dielectric particles in the compositions results in improved repeatability compared to a combination of spherical electrically active particles and dielectric particles.

In another example, the polymer binder may be water-based. In another example, the polymer binder may be curable by ultra-violet radiation. In another example, the second filler may be carbon nanotubes.

The present invention thus provides a pressure-responsive variable electrical resistive ink or coating, comprising irregularly-shaped electrically active particles, and dielectric particles, dispersed in a polymeric binder. The combination of irregularly shaped electrically active particles, and dielectric particles, results in compositions that display higher sensitivity and improved durability compared to previously reported mixtures of regularly shaped electrically active particles, and dielectric particles.

FIG. 14

Figure 14:
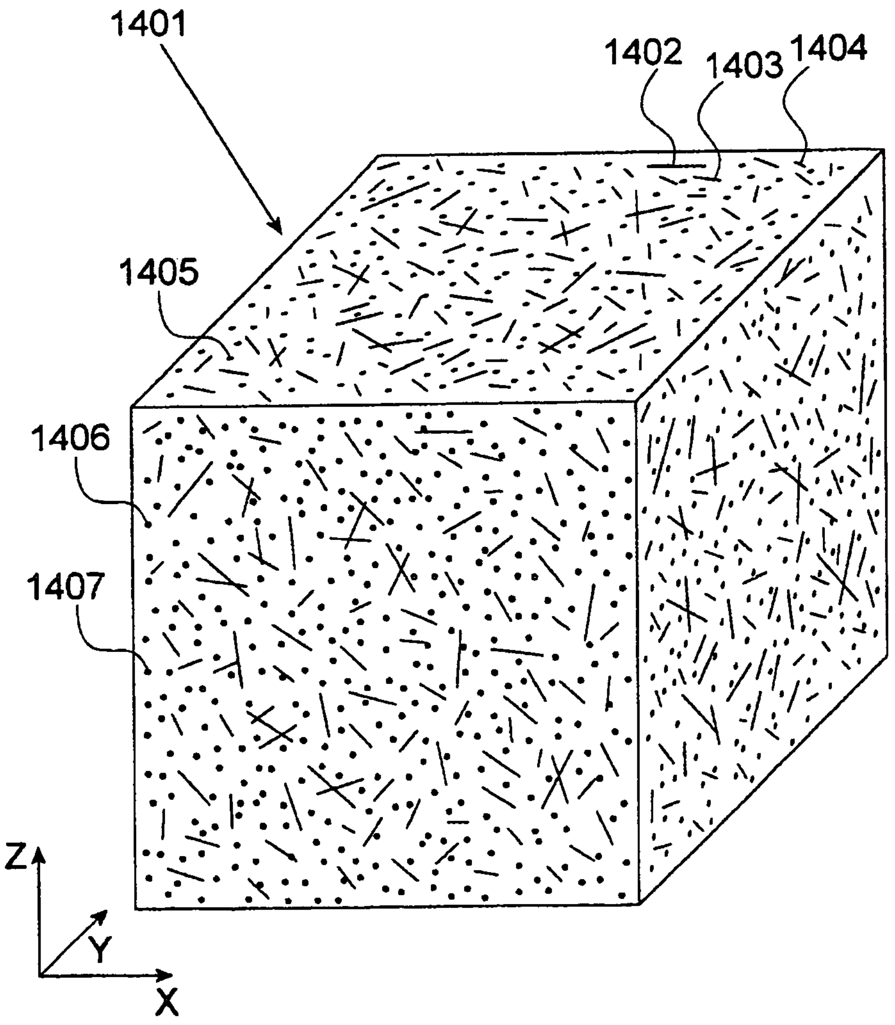
FIG. 14 shows a unit of composition according to the present invention.

FIG. 14 shows a unit of composition according to the present invention. Unit 1401 is shown in the quiescent state, and takes the form of a regular cube. Within the unit 1401, the electrically active acicular shaped particles, such as acicular particles 1402, 1403 and 1404, are randomly oriented. However, if desired, a known process to align particles in a particular orientation may be performed. The dielectric particles, such as dielectric particles 1405, 1406 and 1407, are dispersed within the unit 1401.

The composition unit 1401 displays isotropic conductivity. It is found that the greater the ratio of the second filler (electrically active acicular shaped particles) to the first filler (dielectric particles), the greater the conductivity of the composition. It is found that the greater the aspect ratio of the second filler (electrically active acicular shaped particles), the lower the applied loading required in order for the composition to display behaviour equivalent to that of a reference composition comprising electrically active spherical shaped particles.

The composition unit 1401 is deformable from the quiescent state by an applied distorting force. As previously discussed with reference to Examples 1 and 2 above, the resistance of the composition reduces in response to a compressive force.

FIG. 15

Figure 15:
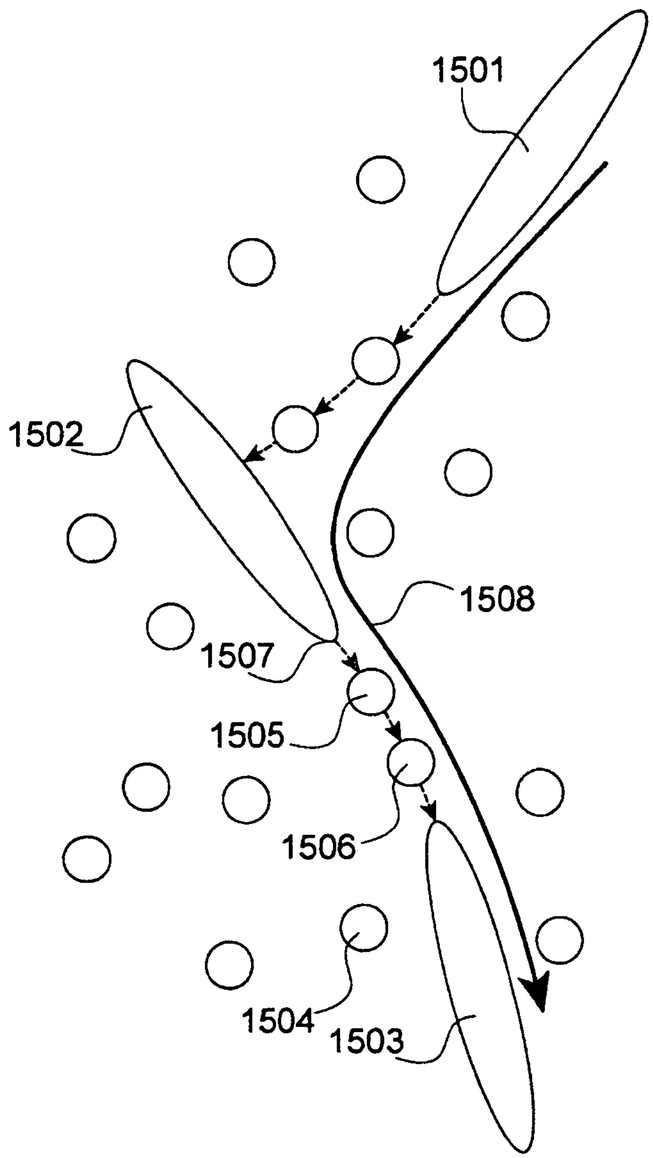
FIG. 15 illustrates a mode of conduction embodying the present invention.

An example of an electrically responsive composite material embodying an aspect of the present invention is detailed in FIG. 15. The arrangement of particles shown in FIG. 15 is a representation of their arrangement of resilient solid produced at step 107. Electrically conductive acicular particles 1501 to 1503 facilitate the conduction of electricity through the solid polymer by quantum tunnelling, although other modes of electrical conduction may take place. The electrically conductive acicular particles 1501 to 1503 are surrounded by dielectric particles, such as particles 1504, 1505 and 1506. The dielectric particles, such as particle 1506, are of a size such that a plurality of these dielectric particles may be dispersed between many of the adjacent acicular particles. Thus, between acicular particle 1502 and acicular particle 1503, dielectric particles 1505 and 1506 are dispersed.

The presence of particles 1505 and 1506 provides an additional conduction path. An example of such a path is from the lower point 1507 of acicular particle 1502, through dielectric particle 1505 and through dielectric particle 1506 to reach acicular particle 1503. Thus, the presence of the dielectric particles, of such a small size, provides additional pathways such that the tunnelling jump between particles becomes relatively shorter. An example of the direction of charge flow through the composite material facilitated by the presence of the dielectric particles is indicated at 1508. In this way, conduction characteristics are enhanced as previously described.

FIG. 16

Figure 16:
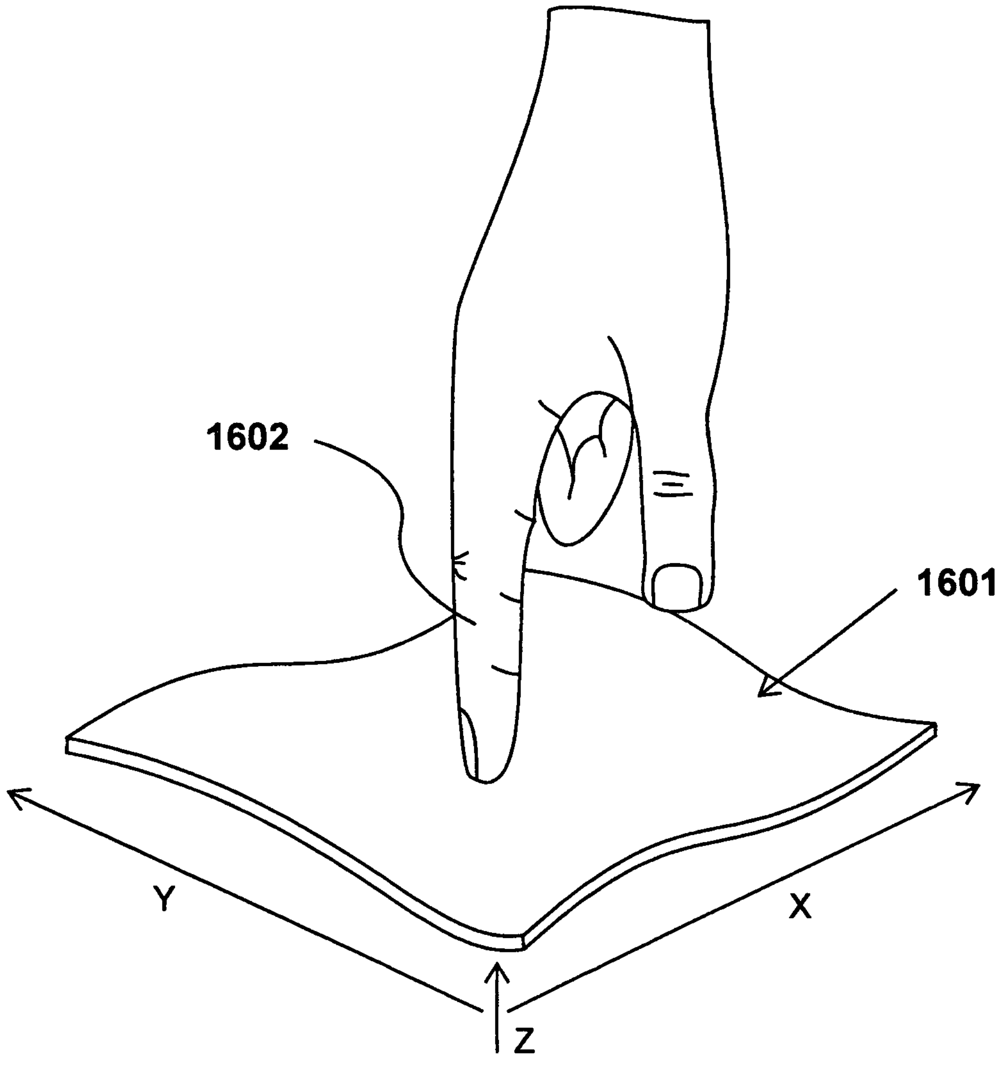
FIG. 16 shows a composition according to the present invention in the form of a lamina.

FIG. 16 shows a composition according to the present invention in the form of a lamina 1601. The lamina 1601 is connectable to an electrical circuit configured to detect a mechanical interaction with the composition, applied to the z-axis direction. In this example, lamina 1601 is sensitive to a mechanical interaction applied by the action of a finger 1602.

FIG. 17

Figure 17:
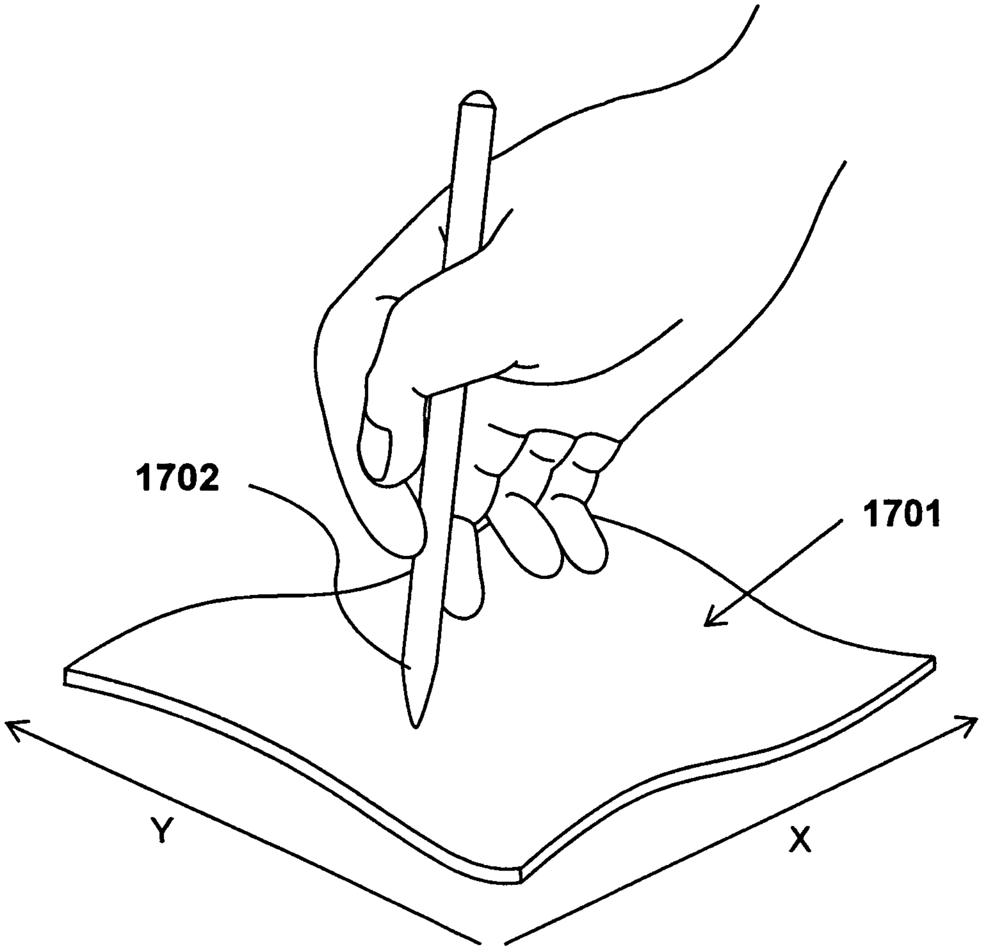
FIG. 17 shows a composition according to the present invention in the form of a film.

FIG. 17 shows a composition according to the present invention in the form of a film 1701. The film 1701 is connectable to an electrical circuit configured to detect a mechanical interaction with the composition, applied in the z-axis direction. In this example, film 1701 is sensitive to a mechanical interaction applied by the action of a stylus 1702. In a layer form of a composition according to the present invention, it is possible to determine a layer thickness that results in conductance in the x-axis and y-axis directions being substantially lower than conductance in the z-axis direction. Thus, compositions according to the present invention may be produced that have different sensitivities and conductance profiles in the x, y and z axes, allowing compositions according to the present invention to be utilised in different applications.

FIG. 18

Figure 18:
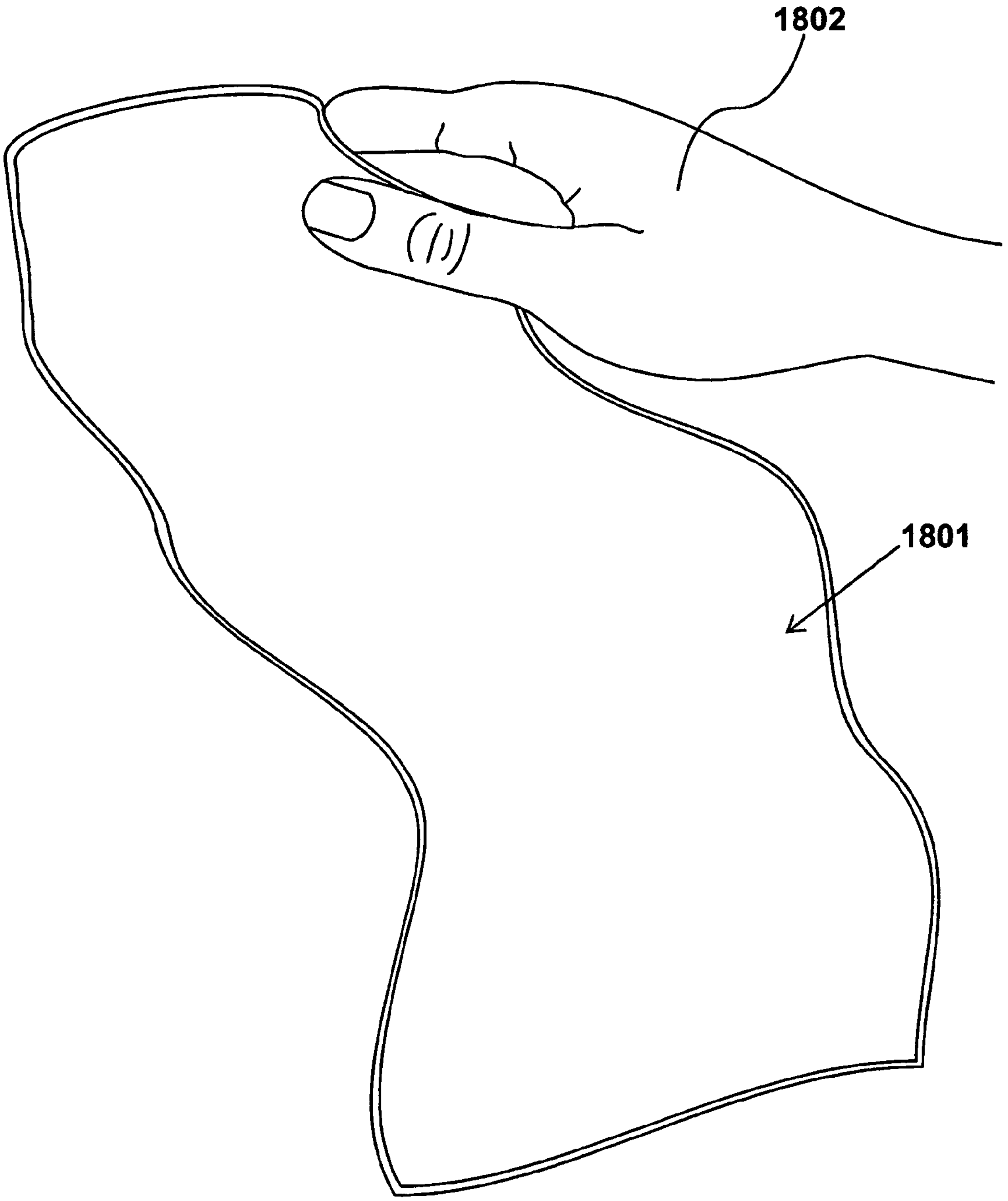
FIG. 18 shows a composition according to the present invention in the form of a sheet.

FIG. 18 shows a composition according to the present invention in the form of a sheet 1801. The sheet 1801 is able to withstand a degree of handling. Thus, sheet 1801 may be gripped in a hand 1802 and lifted, as shown, whilst maintaining its structure. The sheet 1801 also exhibits a degree of resilience such that if the sheet is progressed from a planar form into a crumpled form in response to a mechanical interaction, the sheet will unfold from the crumpled form towards the planar form following removal of that mechanical interaction.

FIG. 19

Figure 19:
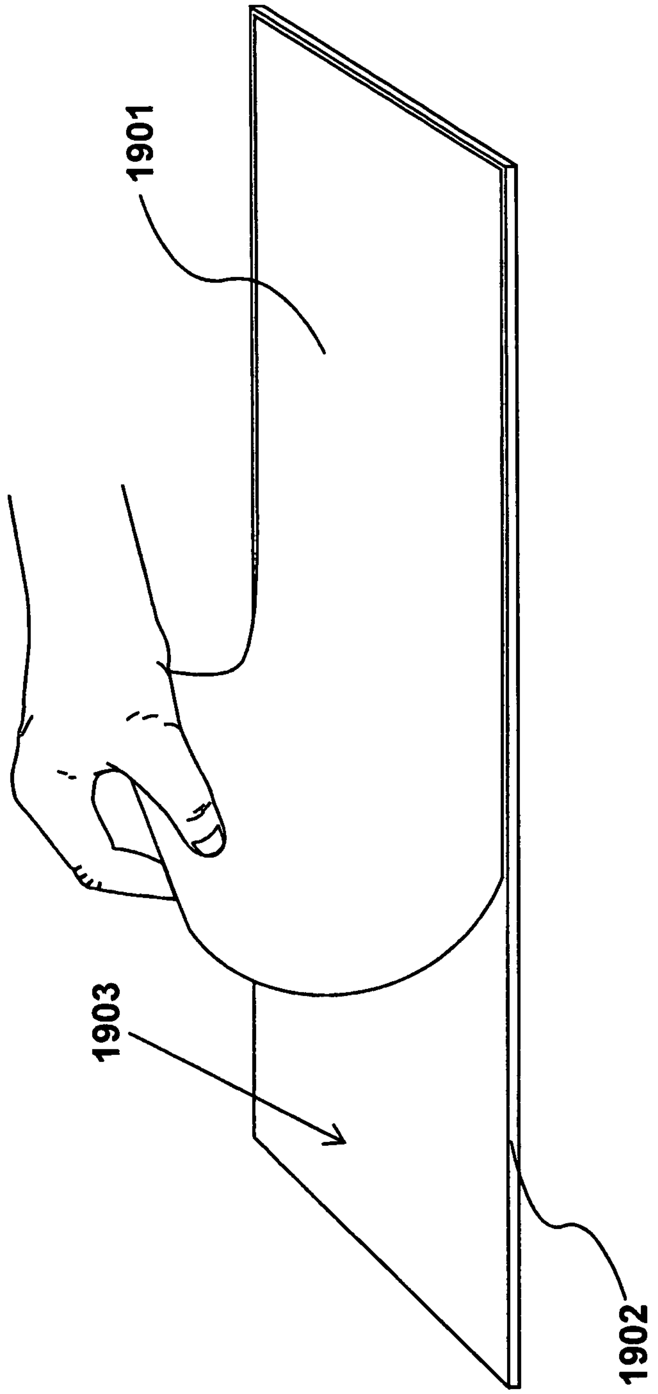
FIG. 19 illustrates a method of producing a sheet of composition according to the present invention.

FIG. 19 illustrates a method of producing a sheet 1901 of composition according to the present invention. The ingredients for the composition are brought together to produce the composition, for example in accordance with steps outlined in Example 1 or Example 2 above. The composition is then laid onto a substrate before drying. When dry, the layer of composition may then be peeled from the substrate. In this example, the substrate 1902 presents a continuous surface 1903 such that the resultant sheet 1901 is also formed as a continuous layer.

As indicated previously, the improved durability of the composition (acicular electrically active particles and dielectric particles) when compared to a reference composition (spherical electrically active particles and dielectric particles) is unexpected. It is presented that it is the combination of electrically active acicular particles and dielectric particles in the compositions that results in improved durability.

Techniques for applying the composition to a substrate include but are not limited to: coating, painting, brushing, rolling, screen-printing, stencil printing, doctor blading, ink-jet printing or application by the Mayer bar technique. The substrate may vary for different applications. The substrate may be, for example: a textile, a film, a circuit board.

In another example, the composition can be coated onto a non-continuous medium such as a net, mesh or textile. When the composition cures a single article is produced comprising both the non-continuous medium and the composition. When the resultant article is peeled from the substrate apertures can be defined in the article, resulting in a breathable layer.

In another example a layer of composition can be made waterproof. This can be achieved through appropriate choice of polymer resin in the composition.

The composition of Example 1 and Example 2 is initially a grey/white colour. However, the composition may be coloured by use of a pigment. This is advantageous for applications in which the aesthetic quality of the composition is important, or in circumstances in which colour may convey information, for example as part of a classification system.

FIG. 20

Figure 20:
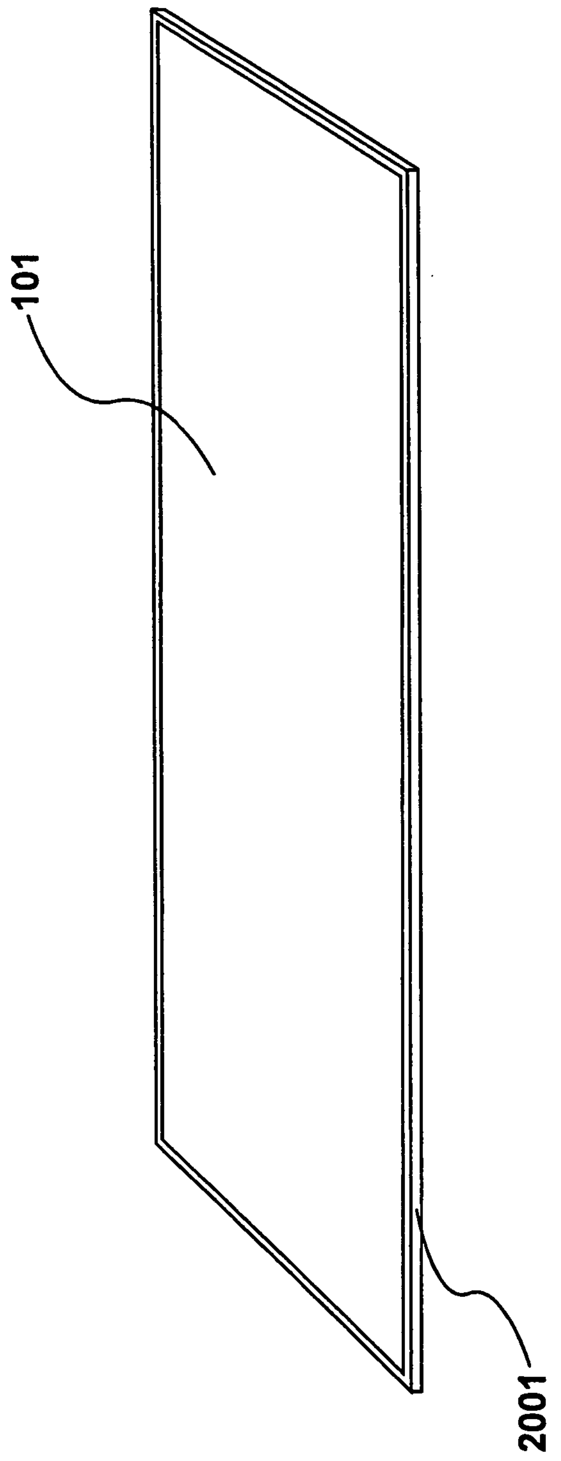
FIG. 20 illustrates a method of applying the composition to a substrate.

FIG. 20 illustrates a method of applying composition 101 to a substrate 2001. The ingredients for the composition are brought together to produce the composition, for example in accordance with the steps outlined in Example 1 or Example 2 above. The composition is then laid onto substrate 2001 before drying. According to the present example substrate 2001 comprises a conductive electrode such that when included in an appropriate electrical circuit mechanical interactions with the composition can be detected. However, it should be appreciated that the substrate may vary depending upon the application and may comprise, for example, a textile or a film.

Techniques for applying the composition to a substrate include but are not limited to coating, painting, brushing, rolling, screen-printing, stencil printing, doctor blading, ink-jet printing or application by the Mayer bar technique. Further embodiments illustrating the application of the present invention will be described further with reference to later Figures.

FIG. 21

Figure 21:
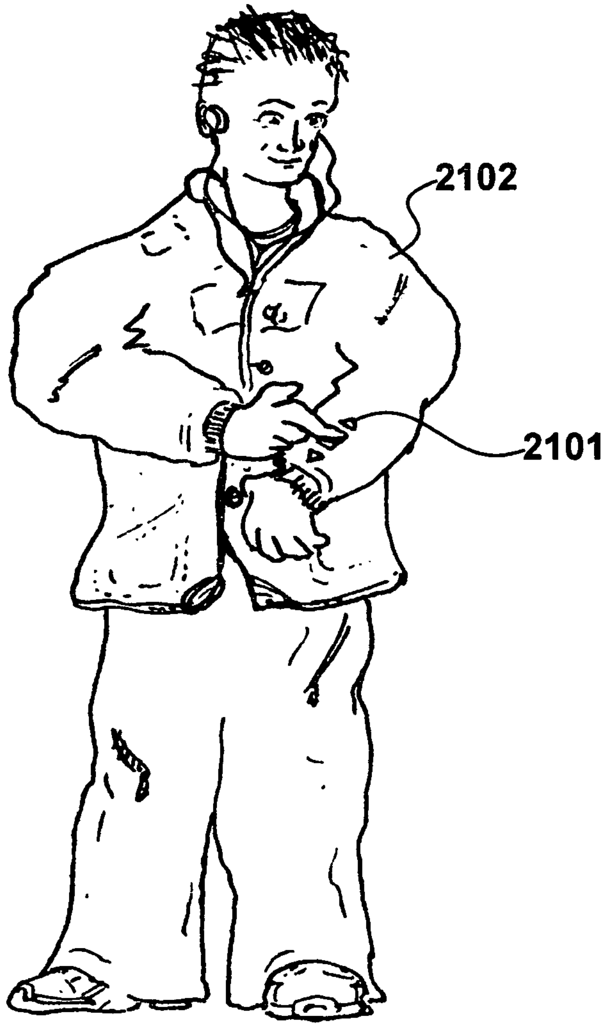
FIG. 21 shows an example application of a polymer composition according to the present invention.

FIG. 21 illustrates an example application of a composition according to the present invention. The composition is utilisable in a sensor, such as sensor 2101 of garment 2102. However, it is to be appreciated that a composition according to the present invention has many applications in many fields and in many devices.

FIG. 22

Figure 22:
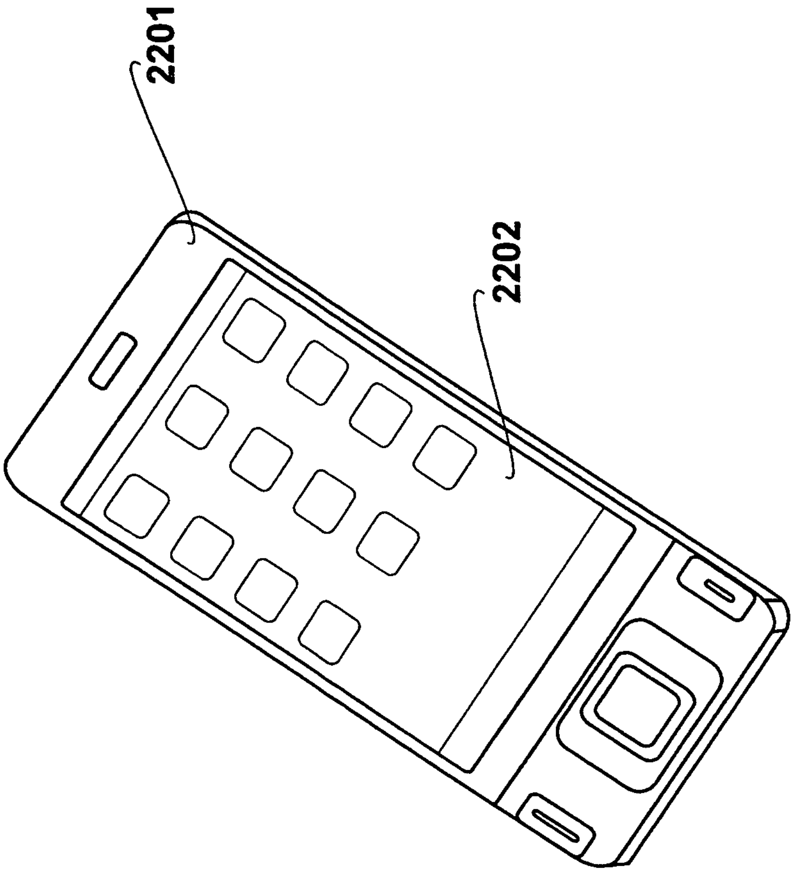
FIG. 22 shows a further example of an application of a polymer composition according to the present invention.

FIG. 22 illustrates a further example of the composition according to the present invention. The composition is utilisable in a sensor present within mobile telephone 2201. In the present example the sensor is present within area 2202, allowing area 2202 to be utilised as a touch screen configured to detect mechanical interactions of a user. Such mechanical interactions are used to select and control functions of mobile telephone 2201.

Although specific examples of applications are given herein, a composition according to the present invention is utilisable in many applications across different fields and devices. For example, a composition according to the present invention may be used in sports applications, medical applications, education applications, industrial applications, mobile telephone applications, toys and games applications, wearable items applications, automotive applications, robotic applications, security applications, keyboard and input device applications.

What we claim is:

1. A method of producing a composite material capable of transition to a resilient electrically responsive composite material for application in a transducer, in which the resilient electrically responsive material is configured to experience a change in an electrical property in response to exposure to a form of applied energy, said method comprising the steps of:

receiving a flowable polymer liquid capable of transition into a resilient material;

introducing electrically conductive acicular particles to said flowable polymer liquid to facilitate the conduction of electricity by quantum tunnelling; and adding dielectric particles to said flowable polymer liquid; and mixing said acicular particles and said dielectric particles within said flowable polymer liquid, wherein said acicular particles have a large dimension and a small dimension, said small dimension and the size of said dielectric particles being between 10 nanometers and 300 nanometers, a plurality of said dielectric particles are dispersed between adjacent acicular particles during said step of mixing, and said dielectric particles consisting of dielectric material only and being in a form that is separate from said electrically conductive acicular particles.

2. The method of claim 1, wherein said electrically responsive composite material is configurable in a transducer by applying said material in its flowable liquid form and facilitating a transition to a resilient solid form.

3. The method of claim 2, wherein said flowable liquid comprises a polymer in solution and said transition is facilitated by the evaporation of said solvent.

4. The method of claim 2, wherein said flowable liquid is a silicone based polymer and said transition is facilitated by a cross-linking reaction.

5. The method of claim 2, wherein said flowable liquid is sensitive to ultra violet radiation and said transition is facilitated by the application of ultra violet radiation.

6. The method of claim 2, wherein the material is applied in its flowable liquid form onto a circuit board, an electrode, a textile or a film.

7. A composite material capable of transition into a resilient electrically responsive material for application in a transducer in which said resilient electrically responsive material is configured to experience a change in an electrical property in response to exposure to a form of applied energy, comprising:

a flowable polymer liquid capable of transition into a resilient material;

electrically conductive acicular particles that facilitate the conduction of electricity through a solid polymer by quantum tunnelling; and a plurality of dielectric particles dispersed between many adjacent acicular particles, wherein said electrically conductive acicular particles have a large dimension and a small dimension, said small dimension and the size of said dielectric particles being between 10 nanometers and 300 nanometers; and said dielectric particles consisting of dielectric material only and being dispersed separately from said electrically conductive acicular particles.

8. The electrically responsive composite material of claim 7, wherein the dielectric material is titanium dioxide.

9. The electrically responsive composite material of claim 7, wherein said dielectric particles have an organic coating to facilitate dispersion.

10. A method of fabricating a transducer comprising a resilient electrically responsive material configured to experience a change in an electrical property in response to exposure to a form of applied energy, said method comprising the steps of:

applying a flowable polymer liquid that contains electrically conductive acicular particles and dielectric particles, said dielectric particles consisting of dielectric material only and being in a form that is separate from said electrically conductive acicular particles;

facilitating a transition of said flowable polymer liquid to a resilient solid polymer to produce said resilient electrically responsive material, in which said resilient solid polymer has said electrically conductive acicular particles and said dielectric particles dispersed therein; wherein said dielectric particles are of a size relative to said electrically conductive acicular particles such that a plurality of said dielectric particles are dispersed between adjacent electrically conductive acicular particles; and said flowable polymer liquid is applied to a substrate comprising an electrode before said transition to a resilient solid.

11. The method of fabricating a transducer of claim 10, wherein said flowable polymer liquid is applied to a circuit board.

12. The method of fabricating a transducer of claim 10, wherein-said flowable polymer is applied to an electrode, a textile or a film.

13. A transducer having a substrate for supporting a flowable polymer liquid, a resilient solid material formed by a transition of said flowable polymer liquid such that said resilient solid material connects to an electronic circuit, wherein:

said resilient solid material comprises a polymer material having semi-conductive acicular particles and dielectric particles dispersed therein; and said dielectric particles are of a size relative to said semi-conductive acicular particles such that a plurality of said dielectric particles are dispersed between adjacent acicular particles, wherein:

said semi-conductive acicular particles are dispersed separately from said dielectric particles;

said dielectric particles consisting of dielectric material only; and the resilient solid material is configured to experience a change in an electrical property in response to exposure to a form of applied energy.

14. The transducer of claim 13, wherein said electrical property is electrical resistance or impedance and said electrical resistance or impedance is monitored by the application of an electrical potential.

15. The transducer of claim 13, wherein said form of applied energy is mechanical energy from a mechanical interaction.

16. The transducer of claim 13, wherein said form of applied energy is electromagnetic radiation.

17. The transducer of claim 13, wherein said form of applied energy is an interaction with sub-atomic particles or ionizing radiation.

18. The transducer of claim 13, wherein said form of applied energy is thermal energy.

19. The method of claim 1, wherein said electrically conductive acicular particles are semi-conductive acicular particles.

20. The electrically responsive composite material of claim 7, wherein said electrically conductive acicular particles are semi-conductive acicular particles.

21. The method of claim 10, wherein said electrically conductive acicular particles are semi-conductive acicular particles.

* * * * *